United States Patent [19]

Holmes et al.

[11] Patent Number: 5,425,204
[45] Date of Patent: Jun. 20, 1995

[54] OPEN MESH PLANT SOIL PROTECTOR APPARATUS

[76] Inventors: Doris L. Holmes, 4834 Sonata La., Los Angeles, Calif. 90042; Teresa G. Halsted, 2628 Lakeview Ave., Los Angeles, Calif. 90039

[21] Appl. No.: 199,008

[22] Filed: Feb. 18, 1994

[51] Int. Cl.$^6$ .............................................. A01G 9/02
[52] U.S. Cl. ................................................ 47/84; 47/25
[58] Field of Search .................................... 47/25, 84 C

[56] References Cited

U.S. PATENT DOCUMENTS

| | | | |
|---|---|---|---|
| 3,961,443 | 6/1976 | Insalaco. | |
| 4,395,844 | 8/1983 | Jopson. | |
| 4,403,443 | 9/1983 | Valente | 47/84 C |
| 4,712,329 | 12/1987 | Anderson et al. | 47/84 C |
| 4,977,703 | 12/1990 | Blanc. | |
| 5,325,627 | 7/1994 | Anderson | 47/25 |

FOREIGN PATENT DOCUMENTS

| | | | |
|---|---|---|---|
| 3540554 | 5/1987 | Germany | 47/25 |
| 3735480 | 5/1989 | Germany | 47/84 C |

*Primary Examiner*—Henry E. Raduazo

[57] ABSTRACT

A new and improved open mesh plant soil protector apparatus includes a first half-cover assembly which includes a first open mesh portion adapted to cover an approximately first half of a quantity of soil in a potted plant. The first half-cover assembly also includes a first pot-encompassing portion connected to the first open mesh portion. The first pot-encompassing portion is adapted to encompass an approximately first half of a pot circumference. A second half-cover assembly includes a second open mesh portion adapted to cover an approximately second half of a quantity of soil in a potted plant. The second half-cover assembly also includes a second pot-encompassing portion connected to the second open mesh portion. The second open mesh portion is adapted to encompass an approximately second half of a pot circumference. The first half-cover assembly is adapted to partially nest with and be secured to the second half-cover assembly on a potted plant, such that the first open mesh portion of the first half-cover assembly and the second open mesh portion of the second half-cover assembly together cover substantially all of the quantity of soil in the potted plant, and such that the first pot-encompassing portion of the first half-cover assembly and the second pot-encompassing portion of the second half-cover assembly together encompass substantially all of a pot circumference.

4 Claims, 2 Drawing Sheets

OPEN MESH PLANT SOIL PROTECTOR APPARATUS

BACKGROUND OF THE INVENTION

1. Field of the Invention

The present invention relates generally to plant protectors and, more particularly, to plant protectors that protect soil in which the plant grows.

2. Description of the Prior Art

Many persons have indoor plants for aesthetic and functional reasons. Plants add beauty to an indoor location, and plants take up carbon dioxide and release oxygen. For a number of reasons, the soil in potted plants is often subject to disturbance. Small children often play with soil and throw soil creating a mess on a carpet or floor. In this respect, it would be desirable if a potted plant protector device were provided which prevented children from playing with the soil of a potted plant. Small children often eat soil as well. This can be hazardous to the child when the soil has been treated with chemicals that are potentially harmful to the child. In this respect, it would be desirable if a potted plant protector device were provided which prevented a child from eating soil of a potted plant.

Aside from children, pets often disturb the soil in potted plants. For example, cats sometimes use the soil of a potted plant as a litter box. In this respect, it would be desirable if a potted plant protector device were provided which protects the soil of the potted plant from disturbance by a pet.

Throughout the years, a number of innovations have been developed relating to soil protectors for potted plants, and the following U.S. patents are representative of some of those innovations: U.S. Pat. Nos. 3,961,443; 4,395,844; 4,403,443; 4,712,239; and 4,977,703. More specifically, U.S. Pat. No. 3,961,443 discloses a cover for a nursery pot that has an outer rim that is complementary to and fits onto the outer rim of the nursery pot. That is, each size of nursery pot must have its own size of pot cover. Generally, plant pots come in many sizes and come in many style outer rims. In this respect, it would be desirable if a potted plant protector device were provided which fits a wide variety of sizes of plant pots and is compatible with a wide variety of outer rims of plant pots.

U.S. Pat. No. 4,395,844 discloses a net that is arrayed on a net support structure in three dimensions around a growing plant. A portion of the net support structure extends vertically along a vertically growing plant. Simply to protect plant soil in a potted plant, it is not necessary to have protection extended to cover the entire plant growing in the pot. In this respect, it would be desirable if a potted plant protector device were provided which does not protect the entire plant but just protects the soil.

U.S. Pat. No. 4,403,443 discloses a flower pot device that includes a screened portion with depending springs which terminate with a peripheral flange ring. The springs and the peripheral flange ring are relatively rigid structures that are tailor made for each pot. As stated above, plant pots come in a wide variety of types, and it would be desirable if a soil protector were provided that were readily adaptable to a wide variety of types of plant pots. Moreover, the rigid nature of the spring and the peripheral flange ring make this device bulky and relatively highly space-consuming when placed in storage. In this respect, it would be desirable if a potted plant protector device were provided which can be folded and takes up relatively little space when not in use.

U.S. Pat. No. 4,712,239 discloses a lidded nursery plant container that, like U.S. Pat. No. 3,961,443 discussed above, provides a specific rigid lid for a specific plant pot.

U.S. Pat. No. 4,977,703 discloses a plant soil protector that includes a plurality of independently adjustable open mesh segments that are bound together to form an integrated soil protector. The separate segments must be manufactured separately and assembled properly into an integrated structure. To avoid the complexities of manufacture and assembly associated with this device, it would be desirable if an open mesh plant soil protector were provided which did not include a plurality of independent units that must be assembled together into a integrated structure.

Still other features would be desirable in a open mesh plant soil protector apparatus. For example, a number of soil protectors disclosed in the U.S. patents cited hereinabove require the presence of a radial slit in the device. The radial slit permits the device to be placed around the stem of a plant. U.S. Pat. No. 4,403,443 very clearly shows the radial slit. For purposes of simplicity of manufacture and use, it would be desirable if an open mesh plant soil protector were provided which does not employ a radial slit.

Some of the U.S. patents cited hereinabove teach the benefits of using an open mesh as a soil protector. The open mesh permits the soil to readily receive air. The open mesh also permits water to be added to the soil with the open mesh in position over the soil. In addition, the open mesh protects the soil from outside interference and prevents the soil from leaving the plant pot. An additional benefit of using an open mesh soil protector is that the open mesh material is readily cleaned. Such reasons underscore the desirability of using an open mesh material as a soil protector.

Thus, while the foregoing body of prior art indicates it to be well known to use open mesh materials as soil protectors, the prior art described above does not teach or suggest an open mesh plant soil protector apparatus which has the following combination of desirable features: (1) prevents children from playing with the soil of a potted plant; (2) prevents a child from eating soil of a potted plant; (3) protects the soil of the potted plant from disturbance by a pet; (4) fits a wide variety of sizes of plant pots and is compatible with a wide variety of outer rims of plant pots; (5) does not protect the entire plant but just protects the soil; (6) can be folded and takes up relatively little space when not in use; (7) does not include a plurality of independent units that must be assembled together into a integrated structure; and (8) does not employ a radial slit. The foregoing desired characteristics are provided by the unique open mesh plant soil protector apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved open mesh plant soil protector apparatus which includes a first half-cover assembly which includes a first open mesh portion adapted to cover an approximately first half of a quantity of soil in a potted plant. The first half-cover assembly also includes a first pot-encompassing portion connected to the first open mesh portion. The first pot-encompassing portion is adapted to encompass an approximately first half of a pot circumference. A second half-cover assembly includes a second open mesh portion adapted to cover an approximately second half of a quantity of soil in a potted plant. The second half-cover assembly also includes a second pot-encompassing portion connected to the second open mesh portion. The second open mesh portion is adapted to encompass an approximately second half of a pot circumference. The first half-cover assembly is adapted to partially nest with the second half-cover assembly on a potted plant, such that the first open mesh portion of the first half-cover assembly and the second open mesh portion of the second half-cover assembly together cover substantially all of the quantity of soil in the potted plant, and such that the first pot-encompassing portion of the first half-cover assembly and the second pot-encompassing portion of the second half-cover assembly together encompass substantially all of a pot circumference.

The first half-cover assembly and the second half-cover assembly are semicircular assemblies adapted to cover soil in a circular potted plant. The first pot-encompassing portion includes a first elastic member adapted to stretch over approximately half of a pot circumference. The second pot-encompassing portion includes a second elastic member adapted to stretch over approximately half of a pot circumference.

The first pot-encompassing portion includes a pair of first connector assemblies, and the second pot-encompassing portion includes a pair of second connector assemblies. The first connector assemblies and the second connector assemblies are adapted to connect with each other to secure the nested first half-cover assembly and the second half-cover assembly to each other and to the potted plant. The pair of first connector assemblies face toward the first open mesh portion of the first half-cover assembly, and the second connector assemblies face away from the second open mesh portion of the second half-cover assembly, such that the first connector assemblies connect with the second connector assemblies when a portion of the second half-cover assembly is nested with a portion of the first half-cover assembly.

The first connector assemblies are located at first end portions of the first pot-encompassing portion. The second connector assemblies are located at second end portions of the second pot-encompassing portion. The first connector assemblies includes hook or loop connector material. The second connector assemblies includes complementary loop or hook connector material.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved open mesh plant soil protector apparatus which has all of the advantages of the prior art and none of the disadvantages.

It is another object of the present invention to provide a new and improved open mesh plant soil protector apparatus which may be easily and efficiently manufactured and marketed.

It is a further object of the present invention to provide a new and improved open mesh plant soil protector apparatus which is of durable and reliable construction.

An even further object of the present invention is to provide a new and improved open mesh plant soil protector apparatus which is susceptible of a low cost of manufacture with regard to both materials and labor, and which accordingly is then susceptible of low prices of sale to the consuming public, thereby making such open mesh plant soil protector apparatus available to the buying public.

Still yet a further object of the present invention is to provide a new and improved open mesh plant soil protector apparatus which prevents children from playing with the soil of a potted plant.

Still another object of the present invention is to provide a new and improved open mesh plant soil protector apparatus that prevents a child from eating soil of a potted plant.

Yet another object of the present invention is to provide a new and improved open mesh plant soil protector apparatus which protects the soil of the potted plant from disturbance by a pet.

Even another object of the present invention is to provide a new and improved open mesh plant soil protector apparatus that fits a wide variety of sizes of plant pots and is compatible with a wide variety of outer rims of plant pots.

Still a further object of the present invention is to provide a new and improved open mesh plant soil protector apparatus which does not protect the entire plant but just protects the soil.

Yet another object of the present invention is to provide a new and improved open mesh plant soil protector apparatus that can be folded and takes up relatively little space when not in use.

An even further object of the present invention is to provide a new and improved open mesh plant soil protector apparatus which does not include a plurality of independent units that must be assembled together into a integrated structure.

Yet another object of the present invention is to provide a new and improved open mesh plant soil protector apparatus that does not employ a radial slit.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
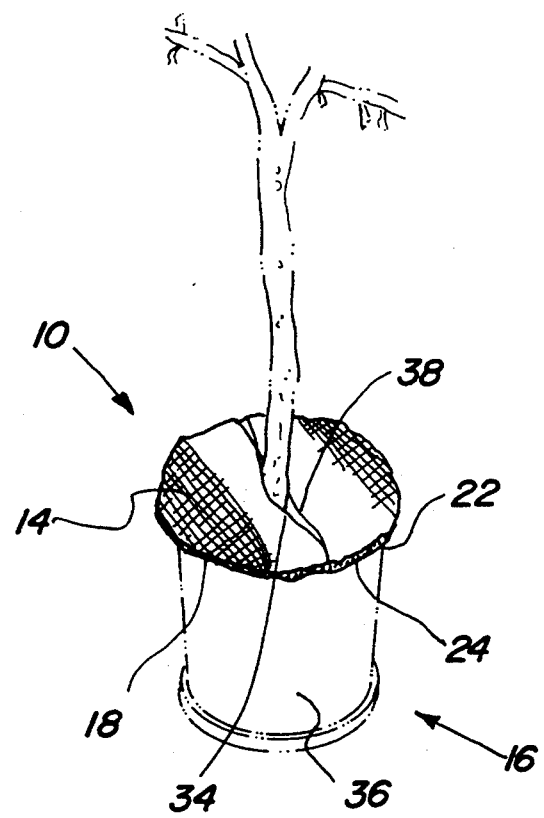
FIG. 1 is a perspective view showing a preferred embodiment of the open mesh plant soil protector apparatus of the invention installed on a potted plant.
Figure 2:
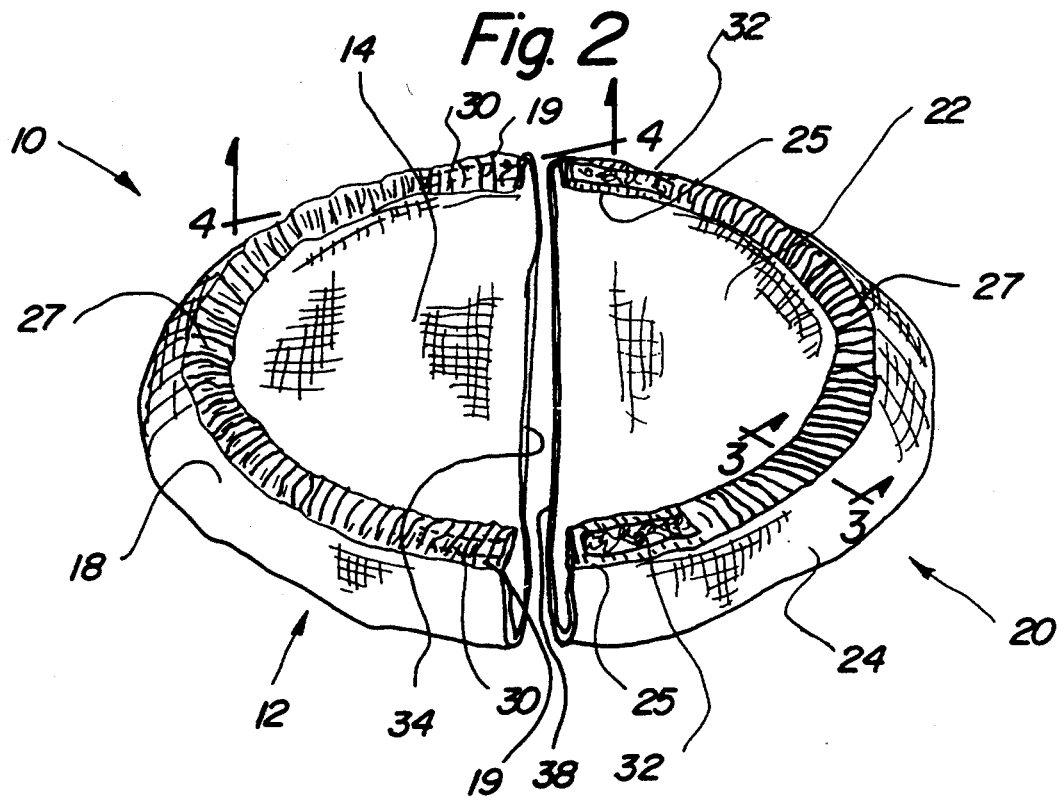
FIG. 2 is an enlarged upside down perspective view of the embodiment of the open mesh plant soil protector apparatus shown in FIG. 1 removed from potted plant.
Figure 3:
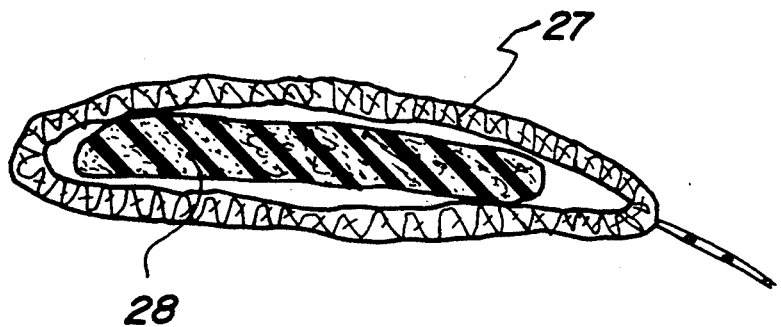
FIG. 3 is an enlarged cross-sectional view of the embodiment of the open mesh plant soil protector apparatus of FIG. 2 taken along line 3—3 thereof.
Figure 4:
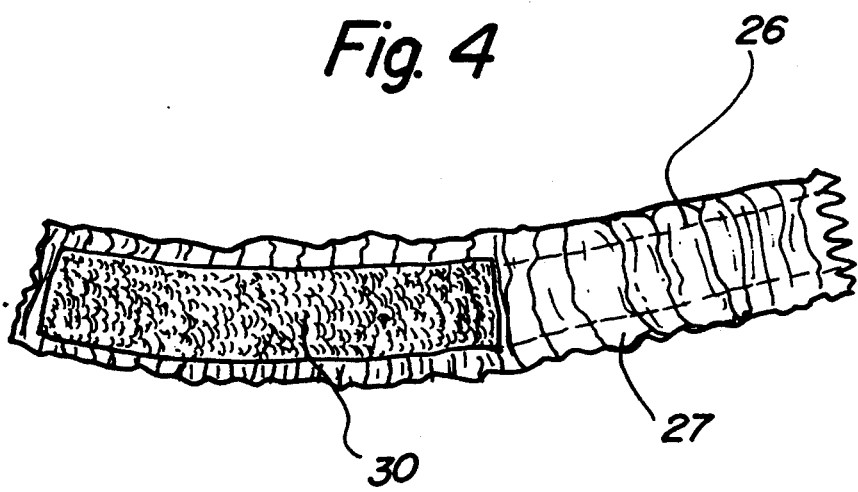
FIG. 4 is an enlarged view of a portion of the embodiment of the invention shown in FIG. 2 taken along the line 4—4 in FIG. 2.

With reference to the drawings, a new and improved open mesh plant soil protector apparatus embodying the principles and concepts of the present invention will be described.

Turning to FIGS. 1-4, there is shown an exemplary embodiment of the open mesh plant soil protector apparatus of the invention generally designated by reference numeral 10. In its preferred form, open mesh plant soil protector apparatus 10 includes a first half-cover assembly 12 which includes a first open mesh portion 14 adapted to cover an approximately first half of a quantity of soil in a potted plant 16. The first half-cover assembly 12 also includes a first pot-encompassing portion 18 connected to the first open mesh portion 14. The first pot-encompassing portion 18 is adapted to encompass an approximately first half of a pot circumference. A second half-cover assembly 20 includes a second open mesh portion 22 adapted to cover an approximately second half of a quantity of soil in a potted plant 16. The second half-cover assembly 20 also includes a second pot-encompassing portion 24 connected to the second open mesh portion 22. The second open mesh portion 22 is adapted to encompass an approximately second half of a pot circumference. The first half-cover assembly 12 is adapted to partially nest with the second half-cover assembly 20 on a potted plant 16, such that the first open mesh portion 14 of the first half-cover assembly 12 and the second open mesh portion 22 of the second half-cover assembly 20 together cover substantially all of the quantity of soil in the potted plant 16, and such that the first pot-encompassing portion 18 of the first half-cover assembly 12 and the second pot-encompassing portion 24 of the second half-cover assembly 20 together encompass substantially all of a pot circumference.

The first half-cover assembly 12 and the second half-cover assembly 20 are semi-circular assemblies adapted to cover soil in a circular potted plant 16. The first pot-encompassing portion 18 includes a first elastic member 26 adapted to stretch over approximately half of a pot circumference. The second pot-encompassing portion 24 includes a second elastic member 28 adapted to stretch over approximately half of a pot circumference. Each of the first elastic member 26 and the second elastic member 28 is contained within an outer pleated sheath 27.

The first pot-encompassing portion 18 includes a pair of first connector assemblies 30, and the second pot-encompassing portion 24 includes a pair of second connector assemblies 32. The first connector assemblies 30 and the second connector assemblies 32 are adapted to connect with each other to secure the nested first half-cover assembly 12 and the second half-cover assembly 20 to each other and to the potted plant 16. The pair of first connector assemblies 30 face toward the first open mesh portion 14 of the first half-cover assembly 12, and the second connector assemblies 32 face away from the second open mesh portion 22 of the second half-cover assembly 20, such that the first connector assemblies 30 connect with the second connector assemblies 32 when a portion of the second half-cover assembly 20 is nested with a portion of the first half-cover assembly 12.

The first connector assemblies 30 are located at first end portions 19 of the first pot-encompassing portion 18. The second connector assemblies 32 are located at second end portions 25 of the second pot-encompassing portion 24. The first connector assemblies 30 includes hook or loop connector material. The second connector assemblies 32 includes complementary loop or hook connector material. The hook or loop connector material and the complementary loop or hook connector material may be the well known Velcro (TM) material.

In operation of the open mesh plant soil protector apparatus 10 of the invention, a potted plant 16 is first obtained. Then, the first open mesh portion 14 of the first half-cover assembly 12 is placed over one-half of the top of the potted plant 16. As shown in FIG. 1, the diameter-length edge 34 of the first open mesh portion 14 is moved up against the trunk or stem of the plant. The first pot-encompassing portion 18 of the first half-cover assembly 12 encircles one-half of the pot 36. The first elastic member 26 fits the first pot-encompassing portion 18 snugly against the pot 36.

Next, the second open mesh portion 22 of the second half-cover assembly 20 is placed over the other half of the top of the potted plant 16. As shown in FIG. 1, the diameter-length edge 38 of the second open mesh portion 22 is moved up against the trunk or stem of the plant. A portion of the second half-cover assembly 20 is nested inside a portion of the first half-cover assembly 12. The second pot-encompassing portion 24 of the second half-cover assembly 20 encircles one-half of the pot 36. The second elastic member 28 fits the second pot-encompassing portion 24 snugly against the pot 36.

More specifically, a portion of the second open mesh portion 22 of the second half-cover assembly 20 is nested under a portion of the first open mesh portion 14 of the first half-cover assembly 12. In addition, a portion of the second pot-encompassing portion 24 of the second half-cover assembly 20 is nested inside a portion of the first pot-encompassing portion 18 of the first half-cover assembly 12. In so doing, the first connector assemblies 30 of the first half-cover assembly 12 connect with the second connector assemblies 32 of the second half-cover assembly 20, whereby the first half-cover assembly 12 and the second half-cover assembly 20 are secured together, and whereby the open mesh plant soil protector apparatus 10 of the invention fits snugly on the pot 36.

To remove the open mesh plant soil protector apparatus 10 of the invention from the potted plant 16, the first connector assemblies 30 and the second connector assemblies 32 are disconnected, and the first half-cover assembly 12 and the second half-cover assembly 20 are pulled apart from each other. In this way, the first half-cover assembly 12 and the second half-cover assembly 20 are removed from the pot 36.

The components of the open mesh plant soil protector apparatus of the invention can be made from inexpensive and durable plastic materials such as well known and readily available nylon mesh or webbing.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved open mesh plant soil protector apparatus that is low in cost, relatively simple in design and operation, and which may advantageously be used to prevent children from playing with the soil of a potted plant. With the invention, an open mesh plant soil protector apparatus is provided which prevents a child from eating soil of a potted plant. With the invention, an open mesh plant soil protector apparatus is provided which protects the soil of the potted plant from disturbance by a pet. With the invention, an open mesh plant soil protector apparatus is provided which fits a wide variety of sizes of plant pots and is compatible with a wide variety of outer rims of plant pots. With the invention, an open mesh plant soil protector apparatus is provided which does not protect the entire plant but just protects the soil. With the invention, an open mesh plant soil protector apparatus is provided which can be folded and takes up relatively little space when not in use. With the invention, an open mesh plant soil protector apparatus is provided which does not include a plurality of independent units that must be assembled together into a integrated structure. With the invention, an open mesh plant soil protector apparatus is provided which does not employ a radial slit.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved open mesh plant soil protector apparatus, comprising:

a first half-cover assembly which includes a first foldable open mesh portion adapted to cover an approximately first half of a quantity of soil in a potted plant and includes a first pot-encompassing portion, connected to said first open mesh portion, adapted to encompass an approximately first half of a pot circumference, wherein said first pot-encompassing portion includes a first elastic foldable member adapted to stretch over approximately half of a pot circumference, a second half-cover assembly which includes a second foldable open mesh portion adapted to cover an approximately second half of a quantity of soil in a potted plant and includes a second pot-encompassing portion, connected to said second open mesh portion, adapted to encompass an approximately second half of a pot circumference, wherein said second pot-encompassing portion includes a second elastic foldable member adapted to stretch over approximately half of a pot circumference, wherein said first half-cover assembly is adapted to partially nest with said second half-cover assembly on a potted plant, such that said first open mesh portion of said first half-cover assembly and said second open mesh portion of said second half-cover assembly together cover substantially all of the quantity of soil in the potted plant, and such that said first pot-encompassing portion of said first half-cover assembly and said second pot-encompassing portion of said second half-cover assembly together encompass substantially all of a pot circumference, wherein said first pot-encompassing portion includes a pair of first connector assemblies, said second pot-encompassing portion includes a pair of second connector assemblies, and said first connector assemblies and said second connector assemblies are adapted to connect with each other to secure said nested first half-cover assembly and said second half-cover assembly to each other and to the potted plant, wherein said first connector assemblies are located at first end portions of said first pot-encompassing portion, wherein said second connector assemblies are located at second end portions of said second pot-encompassing portion, and wherein said pair of first connector assemblies face toward said first open mesh portion of said first half-cover assembly, and said second connector assemblies face away from said second open mesh portion of said second half-cover assembly, such that said first connector assemblies connect with said second connector assemblies when a portion of said second half-cover assembly is nested with a portion of said first half-cover assembly.

2. The apparatus described in claim 1 wherein said first half-cover assembly and said second half-cover assembly are semi-circular assemblies adapted to cover soil in a circular potted plant.

3. The apparatus described in claim 1 wherein said first connector assemblies include hook or loop connector material.

4. The apparatus described in claim 1 wherein said second connector assemblies include complementary loop or hook connector material.

* * * * *